US012123795B2

(12) United States Patent
Schmitz et al.

(10) Patent No.: US 12,123,795 B2
(45) Date of Patent: *Oct. 22, 2024

(54) CRANK TRANSMISSION WITH A CRANKSHAFT FOR CONNECTION TO AT LEAST ONE FOOT-OPERATED OR HAND-OPERATED CRANK

(71) Applicants: Marquardt GmbH, Rietheim-Weilheim (DE); Pinion GmbH, Denkendorf (DE)

(72) Inventors: Michael Schmitz, Mössingen (DE); Christoph Lermen, Karlsruhe (DE); Dietmar Weisser, Tuttlingen (DE); Martin Götz, Villingen-Schwenningen (DE)

(73) Assignees: MARQUARDT GMBH, Rietheim-Weilheim (DE); PINION GMBH, Denkendorf (DE)

( * ) Notice: Subject to any disclaimer, the term of this patent is extended or adjusted under 35 U.S.C. 154(b) by 661 days.

This patent is subject to a terminal disclaimer.

(21) Appl. No.: 17/212,752

(22) Filed: Mar. 25, 2021

(65) Prior Publication Data

US 2021/0364376 A1    Nov. 25, 2021

Related U.S. Application Data

(63) Continuation of application No. PCT/EP2019/075843, filed on Sep. 25, 2019.

(30) Foreign Application Priority Data

Sep. 25, 2018 (DE) ..................... 10 2018 123 575.5

(51) Int. Cl.
*B62M 3/16* (2006.01)
*F16D 3/12* (2006.01)
(Continued)

(52) U.S. Cl.
CPC ................ *G01L 3/104* (2013.01); *F16D 3/12* (2013.01); *B62J 45/413* (2020.02); *B62J 45/421* (2020.02);
(Continued)

(58) Field of Classification Search
CPC ....... G01L 3/104; F16D 3/12; F16D 2300/18; F16D 2300/22; B62J 45/413; B62J 45/421; B62M 3/16; B62M 21/00; Y10T 74/2165
(Continued)

(56) References Cited

U.S. PATENT DOCUMENTS 5,924,519 A * 7/1999 Shimizu .................. B62D 6/10
9,810,593 B2 * 11/2017 Carrasco Vergara .... B62M 3/00
(Continued)

FOREIGN PATENT DOCUMENTS

DE         19609981 A1    9/1997
DE         19816568 A1   11/1999
(Continued)

OTHER PUBLICATIONS

International Search Report with English translation for International Application No. PCT/EP2019/075843, dated Dec. 5, 2019, 6 pages.
(Continued)

*Primary Examiner* — Greg Binda
(74) *Attorney, Agent, or Firm* — REISING ETHINGTON P.C.

(57) ABSTRACT

A crank transmission having a crankshaft for connection to at least one foot or hand crank and at least one gear wheel driven by means of the crankshaft (5) is proposed. A coupling unit is provided between the crankshaft and the gear wheel. Under load, the coupling unit has at least temporarily an angular offset between a crank-side receiving
(Continued)

region and an output region connected to the gear wheel for receiving and outputting the torque generated via the crank.

6 Claims, 4 Drawing Sheets

(51) Int. Cl.
*G01L 3/10* (2006.01)
*B62J 45/413* (2020.01)
*B62J 45/421* (2020.01)
*B62M 21/00* (2006.01)

(52) U.S. Cl.
CPC .............. *B62M 3/16* (2013.01); *B62M 21/00* (2013.01); *F16D 2300/18* (2013.01); *F16D 2300/22* (2013.01); *Y10T 74/2165* (2015.01)

(58) Field of Classification Search
USPC .................. 464/23, 97; 280/260; 324/207.25; 74/594.2
See application file for complete search history.

(56) References Cited

U.S. PATENT DOCUMENTS

| | | | |
|---|---|---|---|
| 11,465,708 B2* | 10/2022 | Schmitz | B62J 45/411 |
| 2010/0305879 A1 | 12/2010 | Grab et al. | |
| 2011/0006760 A1 | 1/2011 | Glueck et al. | |
| 2015/0362387 A1 | 12/2015 | Allard et al. | |
| 2016/0195183 A1* | 7/2016 | Matsuda | F16C 19/364 |
| | | | 464/97 |

FOREIGN PATENT DOCUMENTS

| | | |
|---|---|---|
| DE | 102007046749 A1 | 11/2008 |
| DE | 102007062156 A1 | 6/2009 |
| DE | 102014207761 A1 | 10/2015 |
| EP | 2156156 A1 | 2/2010 |
| EP | 2901120 A2 | 8/2015 |
| WO | 2020064827 A1 | 4/2020 |

OTHER PUBLICATIONS

Written Opinion with English translation for International Application No. PCT/EP2019/075843, dated Dec. 5, 2019, 13 pages.

* cited by examiner

CRANK TRANSMISSION WITH A CRANKSHAFT FOR CONNECTION TO AT LEAST ONE FOOT-OPERATED OR HAND-OPERATED CRANK

CROSS-REFERENCE OF RELATED APPLICATIONS

This is a continuation application of international patent application PCT/EP2019/075843, filed Sep. 25, 2019, which claims the priority of German patent application DE 10 2018 123 575, filed Sep. 25, 2018, the entire content of these earlier applications being incorporated herein by reference.

BACKGROUND

The invention relates to a crank transmission having a crankshaft for connection to at least one foot or hand crank, and to an apparatus for detecting a relative rotation of two guide elements.

In this context, a crank transmission is to be understood as any transmission for vehicles in which a drive or traction is effected via a crank set into rotation by a person by means of physical force and in which this torque is transmitted from there via a mechanical transmission to at least one propulsion element such as a running wheel or a paddle wheel, i.e. in addition to conventional bicycle transmissions also transmissions for multi-wheeled vehicles and/or vehicles that are additionally driven by a motor such as so-called e-bikes or pedelecs, as well as other such vehicles such as pedal boats or the like.

Crank transmissions for vehicles have commercially available for some time.

A sensor arrangement for detecting a torque and/or an angle of rotation has become known with publication DE 198 16 568 A1. The sensor arrangement includes the formation of a torsion element on a shaft by means of a cross-section tapered design, wherein the torsion of the shaft arising under load or the angle of rotation arising in the process is detected by means of the magnetic sensor, and the torque applied is detected via this angle of rotation.

SUMMARY

Against this background, the disclosure has the object of proposing a crank transmission in which the torque applied to a crank transmission via a crankshaft can be detected by a sensor, and of providing an improved apparatus for detecting a relative rotation of two guide elements.

Accordingly, a transmission has a coupling unit between the crankshaft and at least one gear wheel driven by means of the crankshaft, which under load has a torque-dependent angular offset between a crank-side receiving region, which receives the torque generated by means of the crank, and an output region which outputs the torque to the gear wheel.

By means of detection of this angular offset by generating a sensor signal corresponding to the magnitude and/or a direction of rotation of the angular offset, conclusion or determination of the magnitude and/or of the direction of rotation of the received torque is possible.

The detection of the direction of rotation of the received torque can be advantageous, for example when using a so-called coaster brake.

The detection of the magnitude of the received torque can be used, if applicable, in conjunction with transmission data for data acquisition of, for example, the power generated, the crank force, etc. Such data can be further used for storing and displaying the data to a driver, or also for control purposes, e.g. for an automatic gear shift or for controlling an auxiliary drive.

Advantageous further details and embodiments of the disclosure result from the features claimed in the sub claims.

Thus, in a preferred embodiment of the disclosure, a transducer unit is provided for converting the angular offset into a change in a magnetic flux, and a magnetic field-sensitive sensor is provided for detecting this change. This represents a cost-effective, operationally reliable and space-saving design.

For the generation of a torque-dependent angular offset/displacement, a simple option is available by means of a torsion element. For the dependency of the angular offset on the torque introduced, the torsion element is elastically deformable at least in certain areas, i.e. it can be deformed elastically against a restoring torque, wherein the restoring torque depends on the degree of deformation and thus on the load or the torque received, so that the magnitude of the angular offset thus produced is also dependent on the magnitude of the torque received. Due to the restoring torque, the torsion element also resumes its initial shape as the load decreases.

Advantageously, the torsion element is arranged in a cavity of the crankshaft. On the one hand, this allows the torsion element to be of a certain length, if required, while still being accommodated in a space-saving manner. Secondly, the coupling point for coupling to the gear wheel to be driven can easily be arranged in the cavity exactly where the corresponding gear wheel is located. The torsion element can be connected to the crankshaft in the immediate vicinity of the crank, thus ensuring that the torque introduced by the crank is actually transmitted in full to the torsion element and the angular offset is reproduced.

In such an application, the torsion element is expediently a torsion bar with the corresponding linear extension between the connecting points.

The gear wheel is usually formed as a toothed wheel and can be driven by a connecting element between the torsion element and the gear wheel. Such a connecting element is particularly advantageous when arranged in a continuous, at least partially hollow crankshaft, since it can pass through the wall of the hollow shaft and thus bridge the distance between the torsion element and the gear wheel.

A mechanical end stop is provided to limit the variable angular offset and/or to protect the torsion element against over-rotation. This can be formed, for example, by the edge of an oblong hole through which the connecting element passes.

The transducer is preferably designed to convert the angular offset into a change in a magnetic flux. For this purpose, in a further embodiment of the disclosure, at least one magnet and at least two mutually rotatable guide elements are provided. The guide elements are shaped and arranged to change the shape of an air gap located within the magnetic field of the magnet depending on their relative angular position with respect to each other. This angle-dependent change in the air gap causes an angle-dependent change in the entire magnetic return flux. Thus, by detecting a change in the magnetic flux at a different location, the angular offset can be detected and evaluated.

In a particular embodiment of the disclosure, one guide element is provided with a toothed inner circumference and the other guide element is provided with a toothed outer circumference, so that the shape of the air gap depends on the angular position of these teeth. The two guide elements can be dimensioned in such a way that the toothed outer circumference can rotate within the toothed inner circumference, so that both guide elements can be arranged axially at the same position one inside the other.

A Hall sensor, for example, is used as the magnetic field-sensitive sensor, with which the aforementioned changes of the magnetic flux can be easily detected.

Furthermore, the magnetic field-sensitive sensor is preferably placed at a distance from the two guide elements at a structurally suitable location where there is still sufficient magnetic flux for the measurement.

In an advantageous further embodiment of the disclosure, a ring magnet is arranged concentrically to the crankshaft as the magnet, so that an outer return circuit of the magnetic flux is formed outside the outer circumference of the ring magnet and an inner return circuit of the magnetic field is formed inside the inner circumference of the ring magnet.

In this case, the angle-dependent variable air gap area is placed in the area of the outer return circuit and the magnetic field-sensitive sensor is placed in the area of the inner return circuit, or vice versa.

Since a change in the magnetic flux due to a change of the guide elements affects both return circuits, the sensor can be arranged at a distance from the guide elements. This greatly simplifies the design.

By dividing the magnetic flux into two return circuits, the magnetic flux can be varied by changing the overlap of the toothed-shaped guide elements in both return circuits, whereby the second, inner return circuit can be designed to generate a homogeneous magnetic field in the circumferential direction of the axis. As a result, a magnetic field-sensitive sensor can be designed stationary with respect to a non-rotating component, for example stationary with respect to a transmission housing. The sensor signal is thus constant when the shaft is rotating and can be changed by varying the overlap of the guide elements of the external return circuits.

After sensing the change in the flux, the sensor signal can be used by an evaluation unit to determine the torque introduced.

By suitable arrangement of the rotatable guide elements within the angular range to be detected and/or by the use of several sensors, detection of the direction of rotation is also possible with the same arrangement.

The disclosure, particularly in conjunction with the further embodiments described, enables a robust, space-saving and cost-effective sensor system.

BRIEF DESCRIPTION OF THE SEVERAL VIEWS OF THE DRAWING

An embodiment of the disclosure is shown in the drawing and is explained in more detail below with reference to the figures.

In detail, there is shown in

EMBODIMENTS

Figure 1:
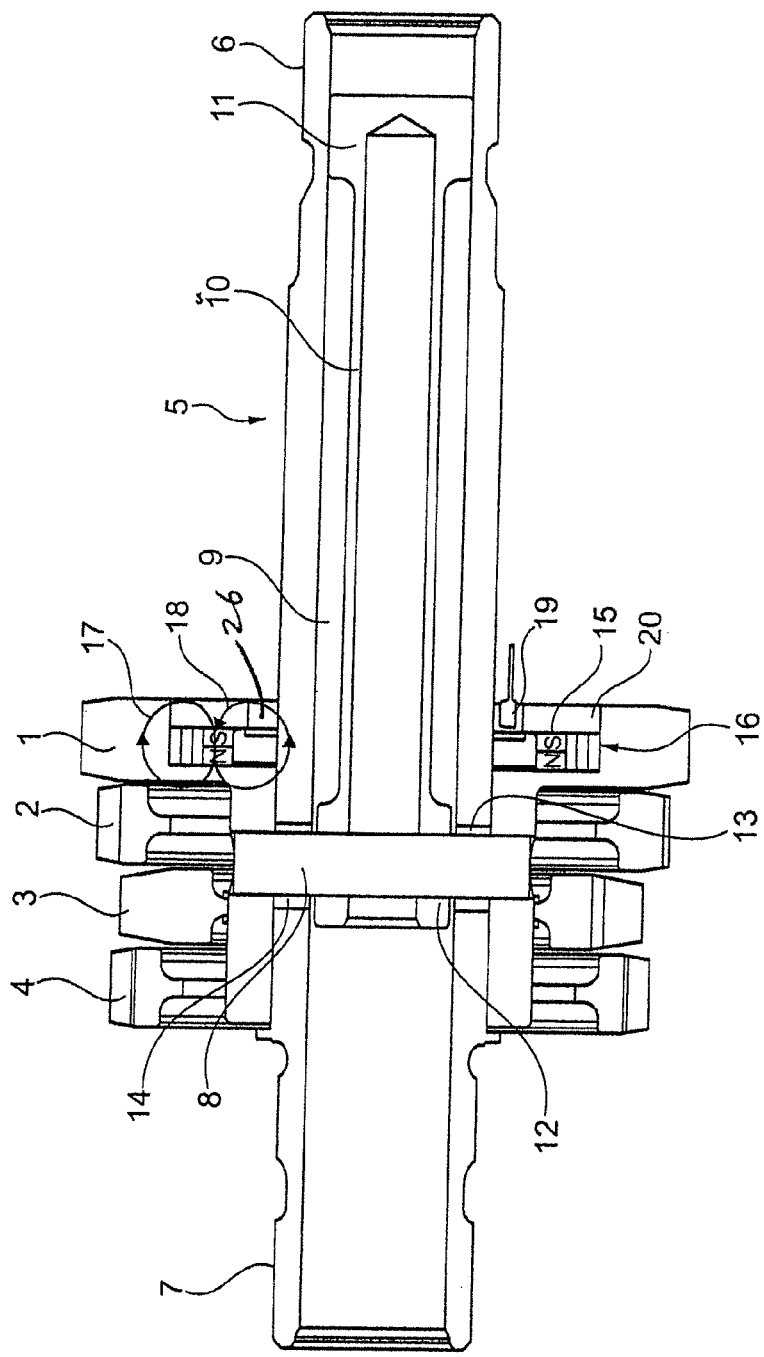
FIG. 1 a longitudinal section through various transmission components and the sensor system for the torque of a transmission, FIG. 2 a top view of two guide elements rotatable relative to each other in a first angular position, FIG. 3 a top view of two guide elements rotatable relative to each other in a second angular position, and FIG. 4 a perspective view of the crankshaft with a connecting pin as a drive element.

FIG. 1 shows the main components of a transmission. Specifically, these include various transmission gear wheels (1, 2, 3, 4), of which the first transmission gear wheel (1) is driven by a crankshaft (5).

The crankshaft 5 is provided on both sides with toothings (6, 7) for mounting foot or hand cranks. A connecting pin (8) projects from the crankshaft and serves to connect the gear wheel (1) to be driven, as will be explained further below.

Figure 4:
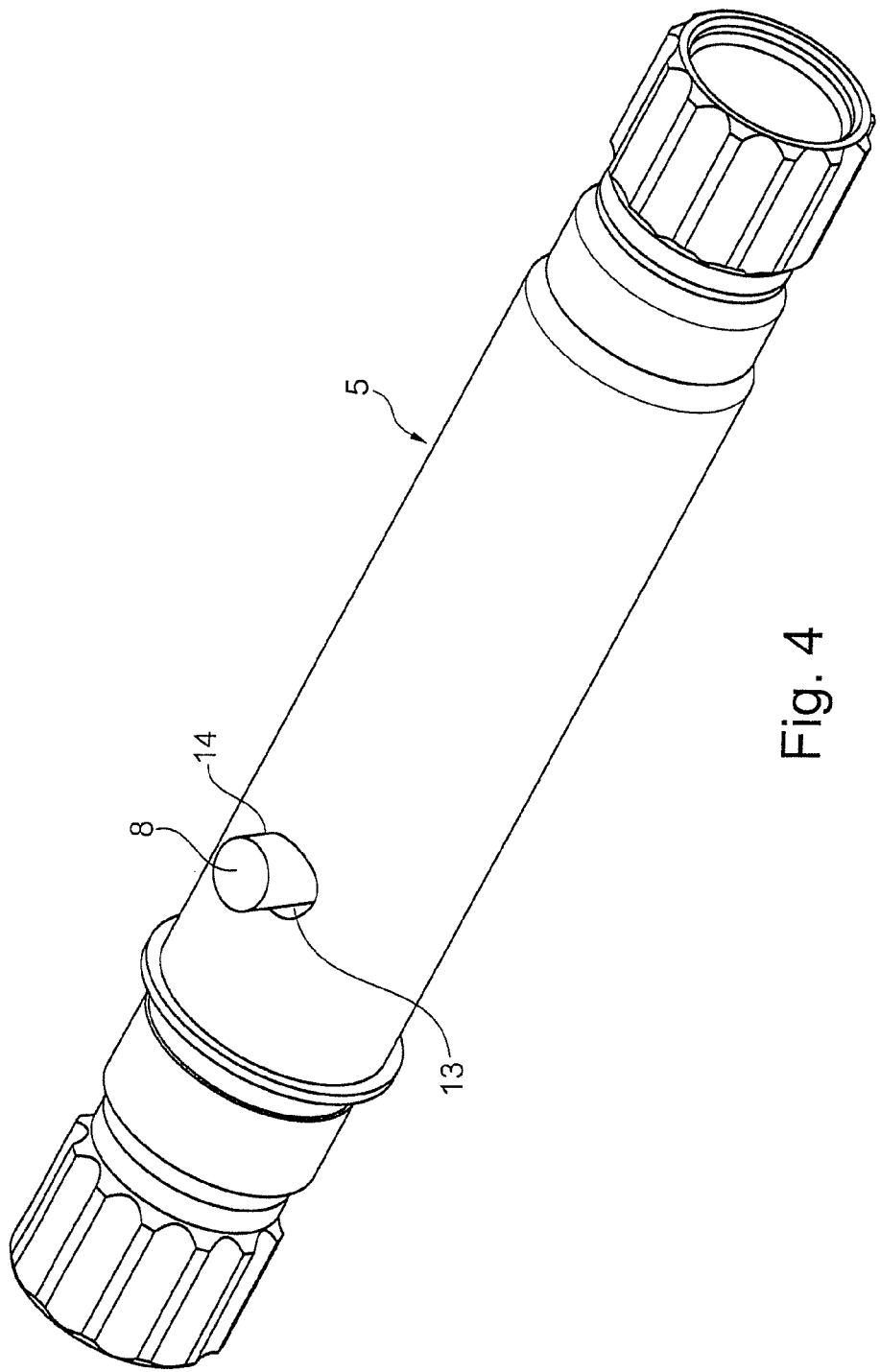

FIG. 1 further shows the inner cavity (9) of the crankshaft (5), in which a torsion bar (10) is arranged. The torsion bar is non-rotatably connected to the crankshaft at its crank-side receiving region (11), for example pressed or welded or shrunk on. At its opposite output region (12), the torsion bar (10) is connected to the gear wheel (1) in a rotationally fixed manner by means of the connecting pin (8) as a drive element for the gear wheel (1). To enable the angular offset according to the invention, the passage (13) through the wall of the crankshaft (5) is formed as an oblong hole (see FIG. 4), the edge (14) of which forms a mechanical end stop for the rotation of the connecting pin in the passage (13).

A ring magnet (15) is inserted in a recess (16) of the gear wheel (1), wherein the two magnetic poles N, S are arranged in the axial direction. This results in an outer return circuit (17) and an inner return circuit (18), as indicated by arrow lines.

A Hall sensor (19) is arranged in the area of the inner return circuit. An annular space (20) is arranged outside the Hall sensor (19) for the arrangement of the guide elements not shown in FIG. 1, and extends far into the area of the outer return circuit (18).

Figure 2:
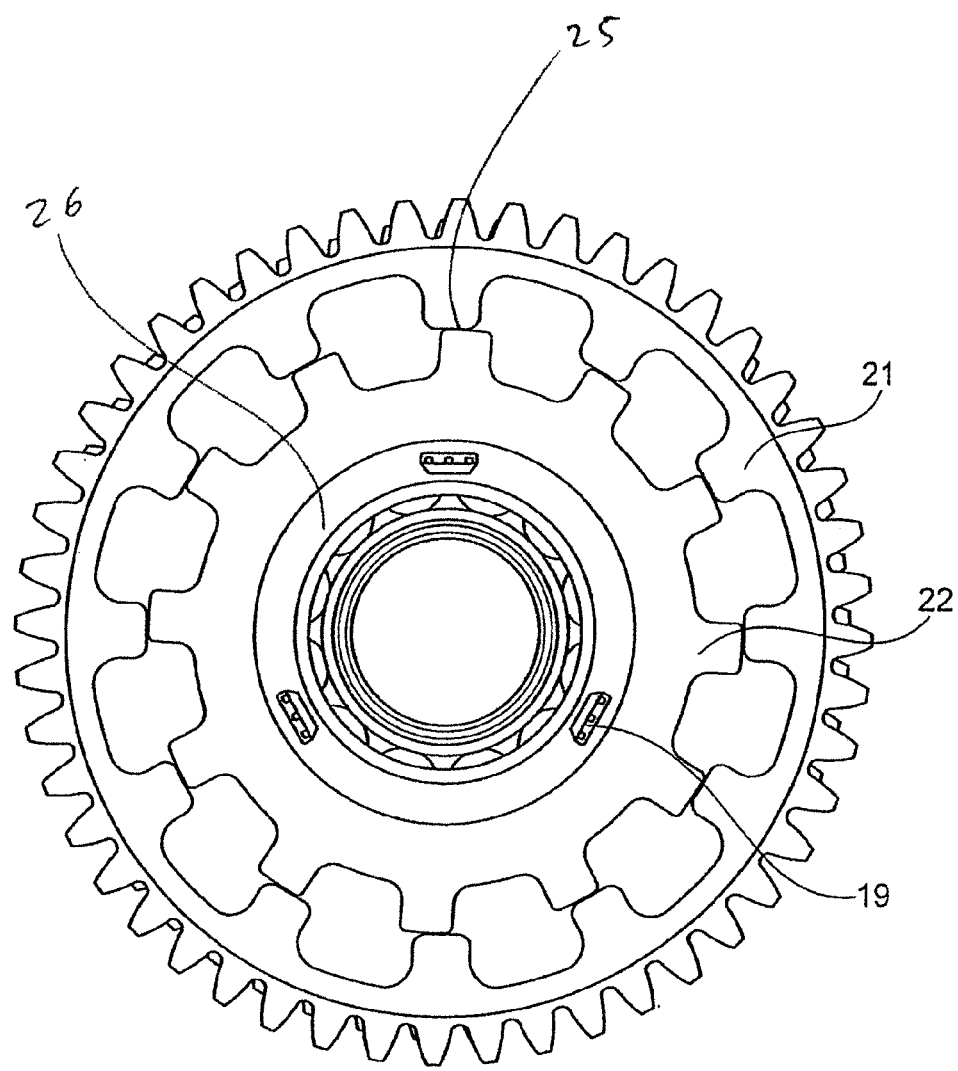
Figure 3:
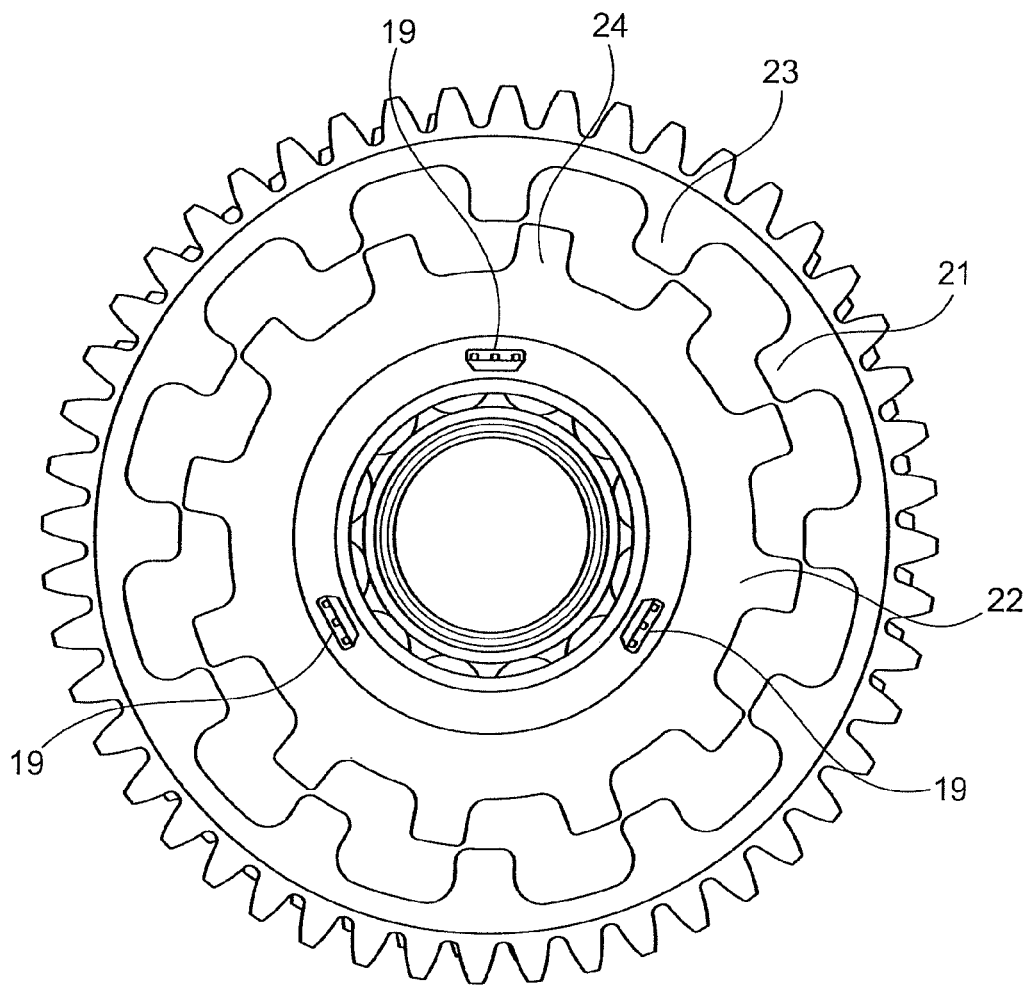

FIGS. 2 and 3 show the guide elements (21, 22) to be accommodated in the annular space (20). The outer guide element (21) and the inner guide element (22) are provided with an inner toothing (23) and an outer toothing (24), respectively, which project into an air gap (25) of the outer return circuit.

The toothings (23, 24) form the contours of the air gap (25), whereby the shape of the outer air gap (25) can be changed by relatively rotating the guide elements (21, 22). FIGS. 2 and 3 show two different angular positions of the guide elements (21, 22) relative to each other. The toothings (23, 24) and the air gap (25) are located in the area of the outer return circuit (17). However, by relatively rotating the guide elements (21, 22), the flux of the magnetic field in the inner return circuit (18) and thus also in the inner air gap (26) is also changed and can thus be detected by sensorically via the Hall sensor (19), wherein FIGS. 2 and 3 illustrate the use of several Hall sensors.

Since the magnetic field of the inner air gap (26) is homogeneous at a constant overlap of the guide elements (21, 22) of the outer return circuit, the sensor signal remains constant during rotation of the shaft. By changing the overlap of the guide elements of the outer return circuits, the magnetic field in the inner air gap (26) can be varied. If more magnetic flux flows through the outer return circuit due to greater overlap of the guide elements, less magnetic flux consequently flows through the inner return circuit and thus also through the inner air gap (26). If the overlap of the guide elements is reduced, this is correspondingly reversed.

The inner guide element (22) is connected to the crankshaft, and the outer guide element (21) is connected to the gear wheel (1), in a rotationally fixed manner. Thus, the angular offset generated by the torsion element (10) is established between the two guide elements (21, 22). The two guide elements (21, 22), the ring magnet (15) and the at least one Hall sensor (19) thus form a transducer unit.

The arrangement described is capable of converting a torque introduced by physical force of a person by means of a crank onto the crankshaft (5) into an angular offset that can be detected sensorically. For this purpose, the torsion bar as a torsion element (10) receives the torque and twists under the corresponding load. This can be the case because the transmission initially opposes the torque, for example by means of a drive wheel to be driven via the transmission. This results in an angular offset over the extension of the torsion bar (10) and thus between the receiving region (11) and the output region (12).

Since the torsion bar (10) is non-rotatably connected there to the gear wheel (1) via the connecting pin (8), this angular offset also occurs between the guide elements (21, 22), which leads to a change in the flux of the magnetic field of the ring magnet (15). This flux change is detected by the Hall sensor (19).

LIST OF REFERENCE SIGNS

1 gear wheel
2 gear wheel
3 gear wheel
4 gear wheel
5 crankshaft
6 toothing
7 toothing
8 connecting pin
9 cavity
10 torsion bar
11 receiving region
12 output region
13 passage
14 edge
15 ring magnet
16 recess
17 return circuit
18 return circuit
19 Hall sensor
20 annular space
21 guide element
22 guide element
23 inner toothing
24 outer toothing
25 air gap
26 air gap

The invention claimed is:

1. A transmission, comprising:
a shaft, and
at least one wheel driven by means of the shaft,
wherein a coupling unit is provided between the shaft and the wheel,
wherein the coupling unit under load at least temporarily has an angular offset between a crank-side receiving region and an output region connected to the wheel for receiving and outputting the torque introduced into the shaft,
wherein a transducer unit is provided for converting the angular offset into a change in a magnetic flux, and wherein a magnetic field-sensitive sensor is provided for detecting the angular offset,
wherein the transducer unit comprises at least one magnet and two magnetic guide elements that can be rotated with respect to each other, wherein the guide elements, within an air gap, change the shape of the air gap in an angle-dependent manner by their shape and their relative angular position,
wherein the coupling unit comprises a torsion element,
wherein the torsion element is connected in a rotationally fixed manner to the at least one wheel at a connection point in the output region by means of a connecting element,
wherein the connecting element extends from a cavity of the shaft through a passage in a wall of the shaft, and
wherein the torsion element is connected in a rotationally fixed manner to the shaft at a connection point in the receiving region.

2. The transmission of claim 1, wherein the torsion element is disposed in a cavity of the shaft.

3. The transmission of claim 1, wherein the torsion element is deformable in a torque-dependent manner against a restoring torque in such a way that the angular offset between the receiving region and the output region results in a torque-dependent manner.

4. The transmission of claim 1, wherein the torsion element is a torsion bar.

5. The transmission of claim 1, wherein one of the guide elements has a toothed inner circumference and the other of the guide elements has a toothed outer circumference, such that the shape of the air gap depends on the angular position of teeth of the toothed inner circumference and of the toothed outer circumference.

6. The transmission of claim 1, wherein the magnetic field-sensitive sensor is provided to detect changes in the magnetic flux, and wherein the magnetic field-sensitive sensor is spaced apart from the guide elements.

* * * * *